(12) United States Patent
Martin

(10) Patent No.: US 7,849,359 B2
(45) Date of Patent: Dec. 7, 2010

(54) PARALLEL PROGRAMMING ERROR CONSTRUCTS

(75) Inventor: Jocelyn Luke Martin, Burwell (GB)

(73) Assignee: The MathWorks, Inc., Natick, MA (US)

( * ) Notice: Subject to any disclaimer, the term of this patent is extended or adjusted under 35 U.S.C. 154(b) by 425 days.

(21) Appl. No.: 11/943,177

(22) Filed: Nov. 20, 2007

(65) Prior Publication Data

US 2009/0132848 A1 May 21, 2009

(51) Int. Cl.
*G06F 11/00* (2006.01)
(52) U.S. Cl. .............................. 714/11; 714/10; 714/38
(58) Field of Classification Search ................... 714/10, 714/11, 25, 38, 48, 57
See application file for complete search history.

(56) References Cited

U.S. PATENT DOCUMENTS

| | | | | |
|---|---|---|---|---|
| 6,173,386 B1* | 1/2001 | Key et al. | ...................... | 714/38 |
| 2002/0152431 A1 | 10/2002 | Fleming | | |
| 2006/0190702 A1* | 8/2006 | Harter et al. | .................. | 712/15 |
| 2007/0169042 A1* | 7/2007 | Janczewski | ................. | 717/149 |

OTHER PUBLICATIONS

Tazuneki, "Concurrent Exception Handling in a Distributed Object-Oriented Computing Environment", XP-002524165, Proceedings Seventh International Conference on Parallel and Distributed Systems, IEEE, 2000, pp. 75-82.
Danaher et al., "Programming with Exceptions in JCilk", Science of Computer Programming, Elsevier Science Publishers vol. 63, No. 2, 2006, pp. 147-171.
Jovanovic et al., "On Issues of Constructing an Exception Handling Mechanism for CSP-Based Process-Oriented Concurrent Software", XP-002524166, Communicating Process Architectures, 2005, pp. 29-41.
Moler, "Parallel MATLAB: Multiple Processors and Multiple Cores", XP-002524167, The MathWorks News & Notes, 2007, 4 pages.
Notification of Transmittal of the International Search Report and the Written Opinion of the International Searching Authority, or the Declaration corresponding to PCT/US2008/083720, dated Apr. 29, 2009, 16 pages.

* cited by examiner

*Primary Examiner*—Robert Beausoliel
*Assistant Examiner*—Joseph D Manoskey
(74) *Attorney, Agent, or Firm*—Harrity & Harrity, LLP

(57) ABSTRACT

A system receives a program, allocates the program to a first software unit of execution (UE) and a second software UE, executes a first portion of the program with the first and second software UEs in parallel, and determines whether an error is detected during execution of the first portion of the program by the first and second software UEs. The system also sends a signal, between the first and second software UEs, to execute a second portion of the program when the error is detected in the first portion of the program, executes the second portion of the program with the first and second software UEs when the error is detected, and provides for display information associated with execution of the first portion and the second portion of the program by the first and second software UEs.

25 Claims, 11 Drawing Sheets

PARALLEL PROGRAMMING INTERFACE
130

PARALLEL PROGRAMMING ENVIRONMENT
120

HARDWARE ENVIRONMENT
110

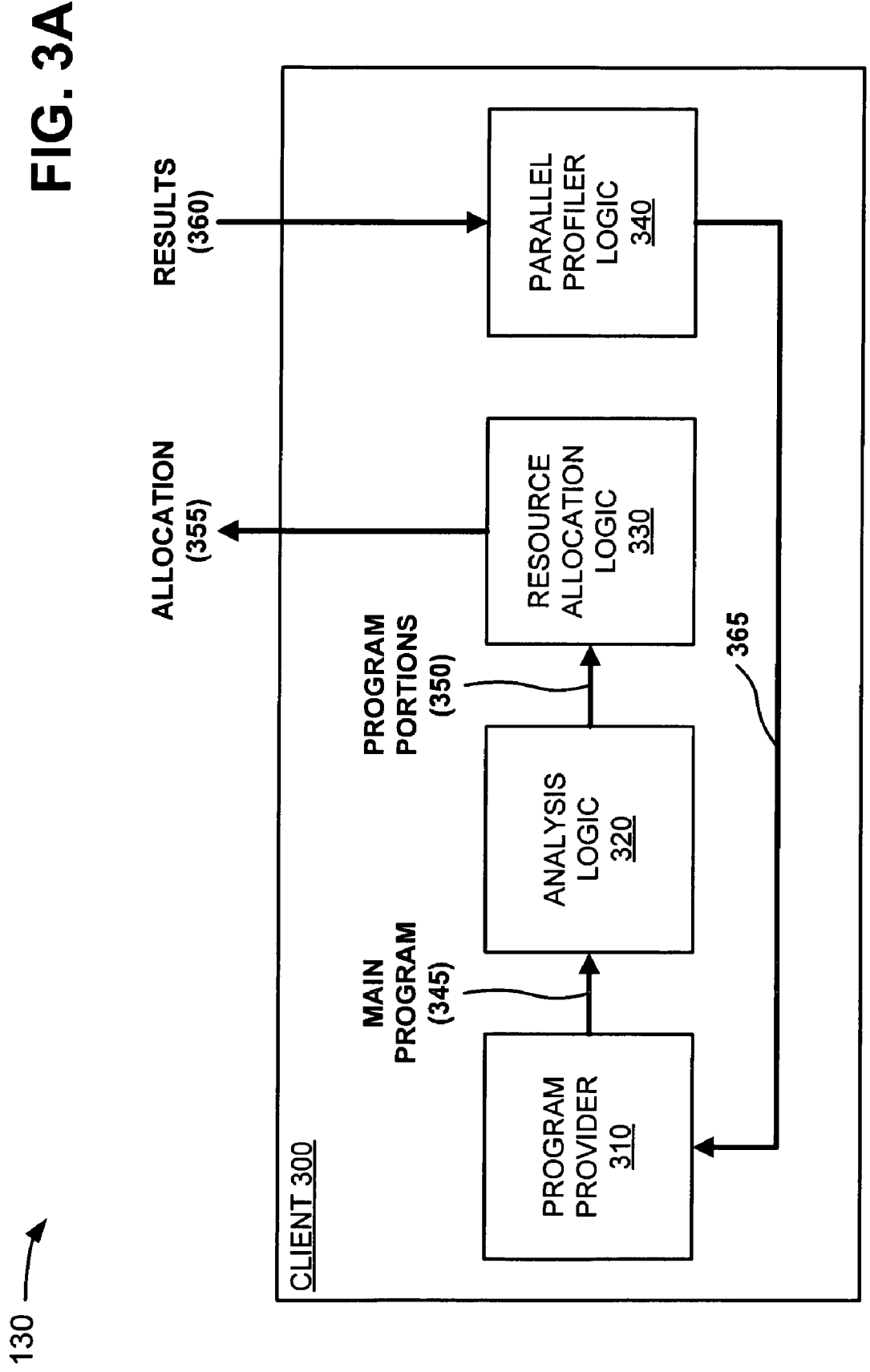

PARALLEL PROGRAMMING ERROR CONSTRUCTS

BACKGROUND

Closely-coupled processors or hardware resources will become widely available within the near future. Examples of such closely-coupled processors (or hardware resources) may include additional processors, threads in a particular processor, additional cores in a central processing unit, additional processors mounted on the same substrate or board, and/or such devices provided within computers connected by a network fabric into a cluster, a grid, or a collection of resources.

Certain computations (e.g., parallel processing or parallel programming) may benefit from the availability of such hardware resources. For example, a complex simulation may run faster if the simulation is divided into portions and the portions are simultaneously run on a number of processing devices in a parallel fashion. Parallel computing arrangements may include a controller that determines how an application should be divided and what application portions go to which parallel processors. For example, a host computer that is running a simulation may act as the controller for a number of parallel processors. Parallel processors may receive instructions and/or data from the controller and may return a result to the controller.

Currently, error handling may be extremely difficult in multi-threaded languages executed in parallel (e.g., in a parallel program). For example, if the parallel program executes on multiple software resources and one of the software resources generates an error, the remaining software resources can cease executing the parallel program upon detection of the error. Thus, the parallel program unsuccessfully finishes, which may be unexpected.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 3A is an exemplary diagram of functional components of a parallel programming interface depicted in FIG. 1;

DETAILED DESCRIPTION

Figure 1:
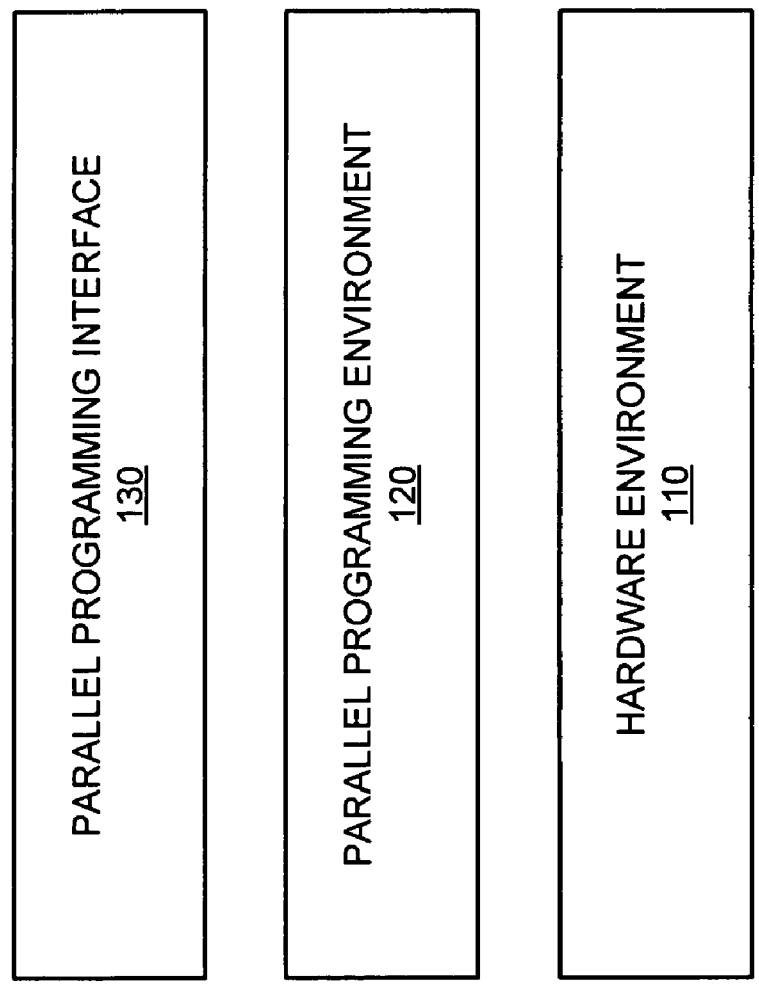
FIG. 1 is an exemplary diagram of an architectural overview in which implementations described herein may be practiced.

The following detailed description refers to the accompanying drawings. The same reference numbers in different drawings may identify the same or similar elements. Also, the following detailed description does not limit the invention.

Overview

Implementations described herein may include a parallel programming error construct or mechanism that enables a parallel technical computing environment (TCE) program to execute normally if no errors are detected, and that enables the parallel TCE program to execute an error catching portion of the parallel TCE program if an error is detected. For example, in one implementation, one or more portions of the parallel programming error construct may be allocated to one or more software units of execution (UEs), and/or the one or more software UEs may receive information generated during execution of a non-error portion (or "try" portion) of the parallel TCE program. If an error is detected by one or more of the software UEs during execution of the parallel TCE program, the one or more software UEs may send a signal to execute an error portion (or "catch" portion) of the parallel TCE program to other software UEs. The one or more software UEs may receive information from execution of the error portion of the parallel TCE program. Information from execution of the parallel TCE program (e.g., execution of both the non-error portion and the error portion of the parallel TCE program) may be provided for display.

A "hardware unit of execution," as the term is used herein, is to be broadly interpreted to include a device (e.g., a hardware resource) that performs and/or participates in parallel programming activities. For example, a hardware unit of execution may perform and/or participate in parallel programming activities in response to a request and/or a task received from a client. A hardware unit of execution may perform and/or participate in substantially any type of parallel programming (e.g., task, data, and/or stream processing) using one or more devices. For example, in one implementation, a hardware unit of execution may include a single processing device that includes multiple cores and in another implementation, the hardware unit of execution may include a number of processors. Devices used in a hardware unit of execution may be arranged in substantially any configuration (or topology), such as a grid, ring, star, etc. A hardware unit of execution may support one or more threads (or processes) when performing processing operations.

A "software unit of execution," as the term is used herein, is to be broadly interpreted to include a software resource (e.g., a worker, a lab (e.g., a smaller scale software unit of execution), etc.) that performs and/or participates in parallel programming activities. For example, a software unit of execution may perform and/or participate in parallel programming activities in response to a receipt of a program and/or one or more portions of the program. A software unit of execution may perform and/or participate in substantially any type of parallel programming using one or more hardware units of execution. A software unit of execution may support one or more threads (or processes) when performing processing operations.

"Parallel programming" and/or "parallel program," as the terms are used herein, are to be broadly interpreted to include any type of processing that can be distributed across two or more resources (e.g., software units of execution, hardware units of execution, processors, microprocessors, clusters, labs, etc.) and be performed at substantially the same time. For example, in one implementation, parallel programming may refer to task parallel programming where a number of tasks are processed at substantially the same time on a number of software units of execution. In task parallel programming, each task may be processed independently of other tasks executing at the same time (e.g., a first software unit of execution executing a first task may not communicate with a second software unit of execution executing a second task). In another implementation, parallel programming may refer to data parallel programming, where data (e.g., a data set) is parsed into a number of portions that are executed in parallel using two or more software units of execution. In data parallel programming, the software units of execution and/or the data portions may communicate with each other as processing progresses. In still another implementation, parallel programming may refer to stream parallel programming (also referred to as pipeline parallel programming). Stream parallel programming may use a number of software units of execution arranged in series (e.g., a line) where a first software unit of execution produces a first result that is fed to a second software unit of execution that produces a second result. Stream parallel programming may also include a state where task allocation may be expressed in a directed acyclic graph (DAG) or a cyclic graph with delays). Other implementations may combine two or more of task, data, or stream parallel programming techniques alone or with other types of processing techniques to form hybrid-parallel programming techniques.

A "process," as the term is used herein, is to be broadly interpreted to include an instance of a computer program that is being executed (e.g., execution of instructions as opposed to instructions statically residing on a medium). A process running on a computer may or may not share resources. A process may further include one or more threads in an exemplary embodiment. A thread may include a fork within one or more processes. Threads operating within a process may share resources associated with the process. In another embodiment, a thread may operate like a process and may not share resources. Threads operating like a process may further include other threads.

A "parallel programming environment," as the term is used herein, is to be broadly interpreted to include any environment capable of performing parallel programming. For example, a parallel programming environment may include a dynamic number of processes provided on one or more hardware and/or software units of execution which may have several different control and data passing layers through which a current behavior of a part or a whole of the environment may be specified. In one implementation, a front-end application (e.g., a parallel programming interface) may interface with the parallel programming environment to provide one or more users with access to the parallel programming environment. In another implementation, the processes involved in the parallel programming environment may include processes associated with a technical computing environment.

A "technical computing environment (TCE)," as the term is used herein, is to be broadly interpreted to include any hardware and/or software based logic that provides a computing environment that allows users to perform tasks related to disciplines, such as, but not limited to, mathematics, science, engineering, medicine, business, etc. For example, a TCE may include a computing environment to develop code in programming languages, such as C++, C, Fortran, Pascal, etc.

In one implementation, a TCE may include a dynamically-typed programming language (e.g., the MATLAB® M language) that can be used to express problems and/or solutions in mathematical notations. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, parallel programming, etc.). In another implementation, a TCE may provide these functions as block sets. In still another implementation, a TCE may provide these functions in another way, such as via a library, etc.

A TCE may be implemented as a text-based environment (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® environment, Stateflow® environment, SimEvents™ environment, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Exemplary Architectural Overview

FIG. 1 is an exemplary diagram of an architectural overview 100 in which implementations described herein may be practiced. As illustrated, overview 100 may include a hardware environment 110, a parallel programming environment 120, and/or a parallel programming interface 130.

Hardware environment 110 may include one or more hardware resources that may be used to perform parallel programming. For example, in one implementation, hardware environment 110 may include one or more hardware units of execution (UEs), and/or each hardware UE may include one or more processors. The processors may include any type of processing device, such as a central processing unit (CPU), a microprocessor, a field programmable gate array (FPGA), an application specific integrated circuit (ASIC), a micro electrical mechanical switch (MEMS), a general purpose graphical processing unit (GPGPU), an optical processor, a reduced instruction processor, etc. In one implementation, each processor may include a single core processor or a multi-core processor. In another implementation, each processor may include a single processing device or a group of processing devices, such as a processor cluster or a computing grid. In still another implementation, each processor may include multiple processors that may be local or remote with respect each other. In a further implementation, each processor may represent a single hardware UE.

Parallel programming environment 120 may provide parallel programming for a main program. For example, in one implementation, parallel programming environment 120 may include a technical computing environment that provides a main program to a controller. The controller may provide portions of the program to one or more software units of execution. The software units of execution may execute the program portions, and may provide results to the controller. The controller may combine the results into a single result, and may provide the single result to the technical computing environment. Further details of parallel programming environment 120 are provided below in connection with FIG. 2.

Parallel programming interface 130 may include a front-end application (e.g., an application program interface (API)) that provides an interface for statically or dynamically accessing, controlling, utilizing, etc. hardware environment 110 and/or parallel programming environment 120. For example, in one implementation, parallel programming interface 130 may be in the form of parallel programming constructs that permit users to express specific parallel workflows. In such an implementation, parallel programming interface 130 may include a program provider that provides a main program to analysis logic. The analysis logic may analyze the main program, may parse the main program into program portions, and may provide the program portions to resource allocation logic. Resource allocation logic may allocate the program portions to one or more software units of execution and/or hardware units of execution. The program portions may be executed, and results may be provided to the program provider. In another implementation, parallel programming interface 130 may include an object API where a user may specify how a program may be parallelized. Further details of parallel programming interface 130 are provided below in connection with FIGS. 3A-3C.

Although FIG. 1 shows exemplary components of architectural overview 100, in other implementations, architectural overview 100 may contain fewer, different, or additional components than depicted in FIG. 1. Moreover, one or more components of architectural overview 100 may perform one or more acts described as being performed by one or more other components of architectural overview 100.

Exemplary Parallel Programming Environment

Figure 2:
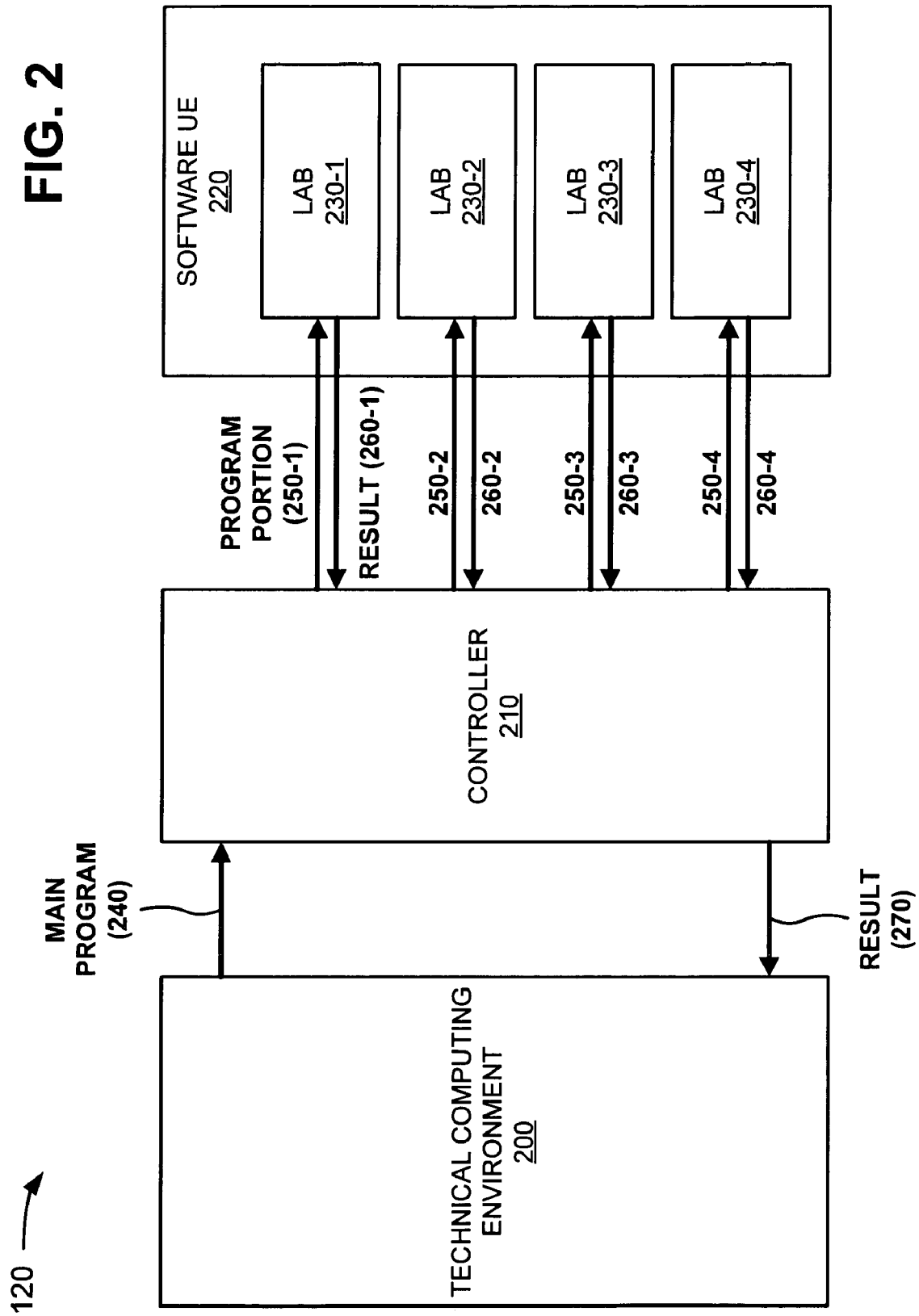
FIG. 2 is an exemplary diagram of a parallel programming environment of FIG. 1.

FIG. 2 is an exemplary diagram of parallel programming environment 120. As illustrated, parallel programming environment 120 may include a technical computing environment 200, a controller 210, and a software unit of execution 220. Technical computing environment 200 may include any of the features described above in the definition of the term "technical computing environment."

Controller 210 may include hardware and/or software based logic to perform controlling operations on behalf of a software program. For example, in one implementation, controller 210 may select and/or control parallel programming activities performed by software UE 220 on behalf of technical computing environment 200.

Software unit of execution (UE) 220 may include any of the features described above in the definition of the term "software unit of execution." In one implementation, software UE 220 may include one or more labs (e.g., labs 230-1, 230-2, 230-3, and 230-4, collectively referred to as "labs 230"). A "lab," as the term is used herein, is to be broadly interpreted to include a software resource that performs and/or participates in parallel programming activities. For example, a lab may perform and/or participate in parallel programming activities in response to a receipt of one or more portions of the program. In one implementation, a lab may be similar to a software unit of execution, except on a smaller scale. In other implementations, a lab may represent a single software unit of execution.

In an exemplary operation, technical computing environment 200 may provide a main program 240 to controller 210. Controller 210 may provide portions of program 240 (e.g., program portions 250-1, 250-2, 250-3, and 250-4, collectively referred to as "program portions 250") to labs 230-1, 230-2, 230-3, and 230-4, respectively, of software UE 220. Labs 230 may execute program portions 250, and may provide results to controller 210. Labs 230 may receive data to use in executing program portions 250. For example, lab 230-1 may provide a result 260-1 to controller 210, lab 230-2 may provide a result 260-2 to controller 210, lab 230-3 may provide a result 260-3 to controller 210, and lab 230-4 may provide a result 260-4 to controller 210. Controller 210 may combine the results into a single result 270, and may provide single result 270 to technical computing environment 200.

Although FIG. 2 shows exemplary components of parallel programming environment 120, in other implementations, parallel programming environment 120 may contain fewer, different, or additional components than depicted in FIG. 2. In still other implementations, one or more components of parallel programming environment 120 may perform one or more tasks described as being performed by one or more other components of parallel programming environment 120.

Exemplary Parallel Programming Interfaces

FIG. 3A is an exemplary diagram of functional components of parallel programming interface 130. As illustrated, parallel programming interface 130 may include a client 300 that includes a variety of functional components, such as a program provider 310, analysis logic 320, resource allocation logic 330, and/or parallel profiler logic 340.

Client 300 may include one or more entities. An entity may be defined as a device, such as a personal computer, a personal digital assistant (PDA), a laptop, or another type of computation or communication device, a thread or process running on one of these devices, and/or an object executable by one of these devices. In an exemplary implementation, client 300 may include a device capable of providing a parallel programming interface, as described herein. Although not shown in FIG. 3A, client 300 may include a technical computing environment (e.g., TCE 200). Other implementations of client 300 may contain fewer, different, or additional components than depicted in FIG. 3A.

Program provider 310 may include hardware and/or software based logic that provides one or more programs for execution. For example, in one implementation, program provider 310 may generate programs created using a technical computing environment, as defined above. As shown in FIG. 3A, program provider 310 may provide a main program 345 to analysis logic 320.

Analysis logic 320 may receive main program 345, and may include hardware and/or software based logic that analyzes main program 345 and parses main program 345 into one or more program portions 350. In one implementation, analysis logic 320 may include language constructs (as described below in connection with FIG. 5) that parse main program 345 into one or more program portions 350. As shown in FIG. 3A, analysis logic 320 may provide program portions 350 to resource allocation logic 330. In another implementation, analysis logic 350 may provide multiple copies of main program 345 (e.g., instead of program portions 350) to resource allocation logic 330. Further details of analysis logic 320 are provided below in connection with FIGS. 5 and 6.

Resource allocation logic 330 may receive program portions 350, and may include hardware and/or software based logic that dynamically allocates (as indicated by reference number 355) program portions 350 to one or more software UEs (e.g., software UE 220) for parallel execution. Although not shown in FIG. 3A, allocation 355 may be provided to one or more software UEs, and the software UEs may be executed by one or more hardware UEs in a parallel programming manner. Alternatively and/or additionally, if no external resources (e.g., external software UEs or external hardware UEs) are available, allocation 355 may be executed via software UEs and/or hardware UEs of client 300. The software UEs may return results 360 of the execution of program portions 350 (or multiple copies of main program 345) to parallel profiler logic 340.

Parallel profiler logic 340 may include hardware and/or software based logic that receives results 360 from the software UEs, and provides statistical information and/or data for display 365 (hereinafter referred to as "display data 365"), based on results 360, to program provider 310. In one implementation, parallel profiler logic 340 may combine results 360 into a single result, and may provide the single result to program provider 310.

Client 300 (e.g., via analysis logic 320) may define a sub-group behavior for each of program portions 350. A "sub-group," as the term is used herein, may be broadly defined to include any part of the overall set of processes (e.g., main program 345 and/or program portions 350). For example, the sub-group behavior may relate to the parallel programming styles that may be employed on the group of program portions 350. However, client 300 may dynamically change the behavior of one or more of program portions 350 as code is executed for other program portions 350. In one implementation, client 300 may use the control layer to change the current state of a sub-group at any time, which may dynamically change the behavior of that portion of the group. For example, an application (e.g., main program 345) may include different phases (e.g., an input phase, an analysis phase, an output phase, etc.), and parallel programming needs may be different for each phase.

In one implementation, the sub-group behavior may include an unused state (e.g., the initial state of a process when it is not being used), a user-controlled UE state (e.g., if a user has acquired a process as a UE object), a task parallel state (e.g., an execution state used by parallel programming constructs), a single program, multiple data (SPMD) state (e.g., one or more processes may have a message passing interface (MPI) ring between them with appropriate values for rank and size), a stream state (e.g., a state where task allocation may be expressed in a directed acyclic graph (DAG) or a cyclic graph with delays), etc. Each of program portions 350 may be in one of the above-mentioned states, and may request other tasks to be placed in a new state.

In another implementation, client 300 may be interactive in that resource allocation logic 330 may permit a user to dynamically control a current setup (e.g., via scripts, functions, command lines, etc.). Thus, client 300 and its configuration may change based on an actual analysis that the user may be currently undertaking. In another implementation, resource allocation logic 330 may be connected to one or more clusters of software UEs 220 and may use processes derived from each of the clusters, as well as client 300, to form the functional components of client 300. In still another implementation, client 300 may include devices having different architectures and/or operating systems (OSs) (i.e., client 300 may execute across multiple platforms). For example, client 300 may include a different architecture and/or OS than software UE 220.

In one exemplary implementation, main program 345 may be submitted in a batch manner to a cluster (e.g., a cluster of software UEs 220 and/or a cluster of labs 230). For example, a user may interactively develop main program 345, and may save main program 345 in a file (e.g., an M file). A command may exist in main program 345 (e.g., in the M file) that may cause one lab (e.g., one of labs 230) in the cluster to act as a client where the execution of main program 345 initiates. Main program 345, for example, may use four labs 230 and a client (e.g., one of labs 230 acting as a client), may initiate on the client, and may utilize as many labs 230 as necessary to carry out execution. In another example, a special type of job may be created that creates a pool (or cluster) of labs, where one of the initiated processes of the job may act as the client, and the rest of the processes may be in the pool.

Figure 3B:
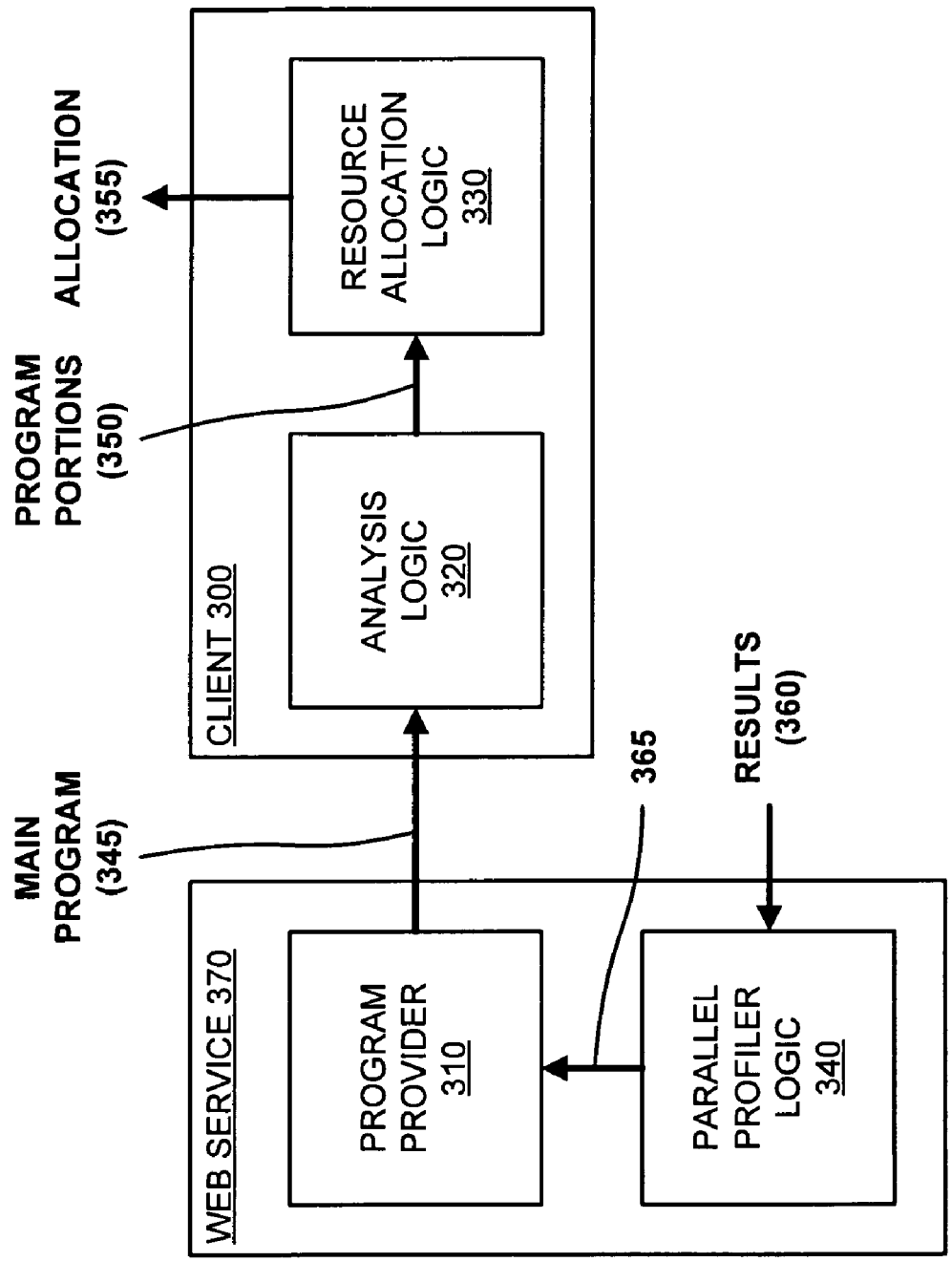
FIG. 3B is an exemplary diagram of functional components of the parallel programming interface in an alternative arrangement.

FIG. 3B is an exemplary diagram of functional components of parallel programming interface 130 in an alternative arrangement. The alternative arrangement depicted in FIG. 3B is the same as the arrangement of FIG. 3A, except that program provider 310 and/or parallel profiler logic 340 may be included in a web service 370, while analysis logic 320 and/or resource allocation logic 330 may be included in client 300. Program provider 310, analysis logic 320, resource allocation logic 330, and/or parallel profiler logic 340 may operate in the manner as described above in connection with FIG. 3A.

Web service 370 may provide access to one or more programs (e.g., main program 345) provided by program provider 310, applications accessed by main program 345, one or more applications provided by parallel profiler logic 340, etc. A "web service," as the term is used herein, is to be broadly interpreted to include any software application that allows machine-to-machine communications over a network (e.g., a local area network (LAN), a metropolitan area network (MAN), a wide area network (WAN), such as the Internet, etc.). For example, a web service may communicate with a client (e.g., client 300) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

In one exemplary implementation, web service 370 may allow a destination (e.g., a computer operated by a customer) to perform parallel programming and/or parallel profiling (e.g., via parallel profiler logic 340) using hardware and/or software UEs that may be operated by a service provider (e.g., client 300). For example, the customer may be permitted access to client 300 to perform parallel programming and/or parallel profiling if the customer subscribes to one of the offered web services. The service provider may maintain a database that includes parameters, such as parameters that indicate the status of hardware UEs, software UEs, etc. The service provider may perform a look-up operation in the database if a request for parallel programming and/or parallel profiling is received from the customer. The service provider may connect the customer to parallel programming and/or parallel profiling resources that are available based on parameters in the database.

In another exemplary implementation, the customer may receive web service 370 on a subscription basis. A subscription may include substantially any type of arrangement, such as monthly subscription, a per-use fee, a fee based on an amount of information exchanged between the service provider and the customer, a fee based on a number of processor cycles used by the customer, a fee based on a number of hardware UEs, software UEs, etc., used by the customer, etc.

Figure 3C:
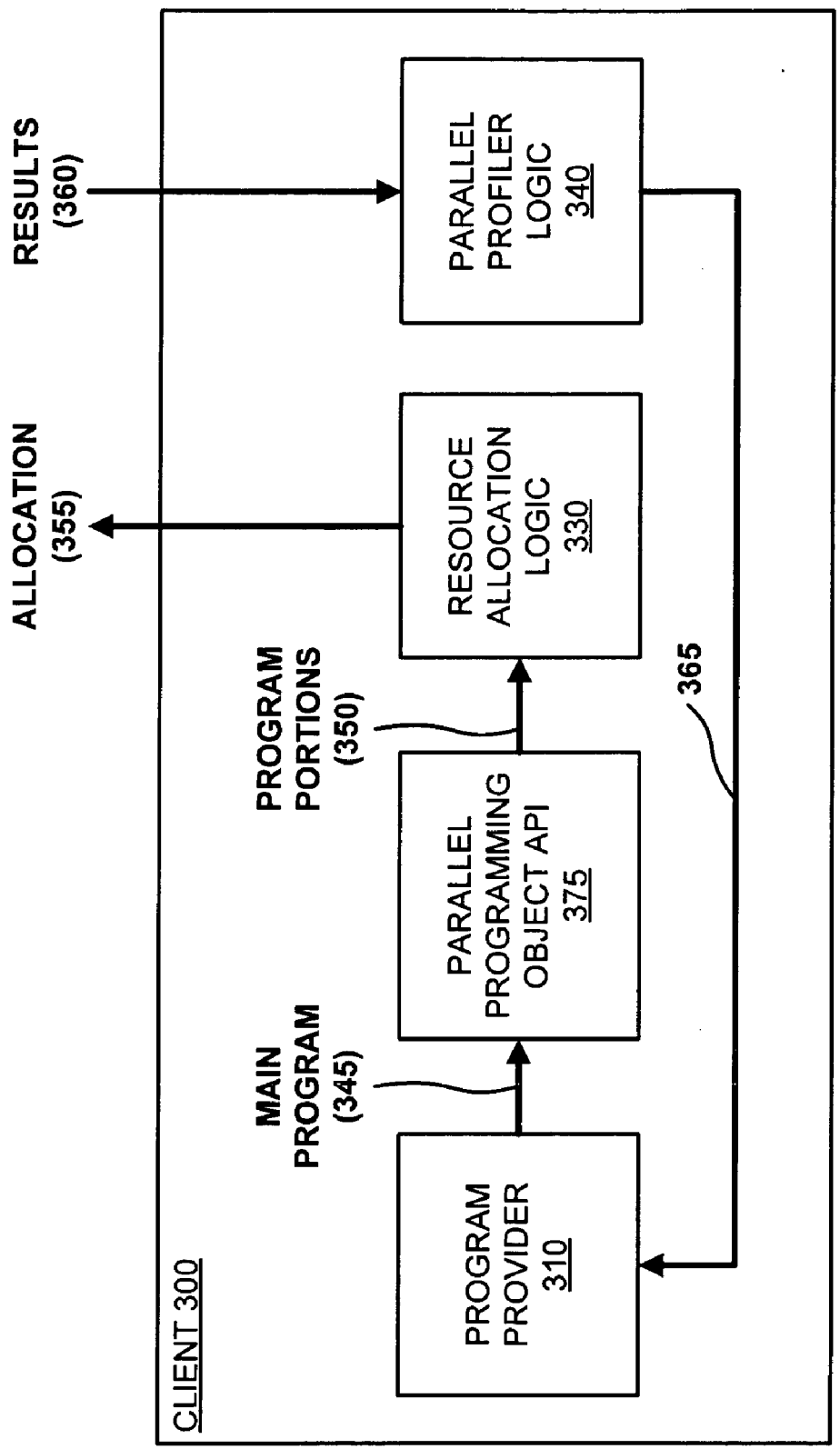
FIG. 3C is an exemplary diagram of functional components of the parallel programming interface in another alternative arrangement.

FIG. 3C is an exemplary diagram of functional components of parallel programming interface 130 in another alternative arrangement. The alternative arrangement depicted in FIG. 3C is the same as the arrangement of FIG. 3A, except that analysis logic 320 may be replaced with a parallel programming object API 375. Program provider 310, resource allocation logic 330, and/or parallel profiler logic 340 may operate in the manner as described above in connection with FIG. 3A.

Parallel programming object API 375 may permit a user to specify how main program 345 may be broken into portions that may be executed in parallel. Parallel programming object API 375 may cooperate with resource allocation logic 330 and/or an execution mechanism (e.g., one or more software UEs 220) in a similar manner that analysis logic 320 cooperates with these components. However, parallel programming object API 375 may offer more flexibility and/or customization. In one implementation, parallel programming interface object API 375 (e.g., a code-based interface) may define and implement an object in a technical computing environment (e.g., TCE 200) that corresponds to another one or more (or set of) executing technical computing environments. Parallel programming object API 375 may permit customizable parallelism of a program (e.g., main program 345), and may be nested in other calls or functions (e.g., in the parallel programming construct described below in connection with FIG. 5).

Although FIGS. 3A-3C show exemplary components of parallel programming interface 130, in other implementations, parallel programming interface 130 may contain fewer, different, or additional components than depicted in FIGS. 3A-3C. In still other implementations, one or more components of parallel programming interface 130 may perform one or more tasks described as being performed by one or more other components of parallel programming interface 130.

Exemplary Client/Web Service Architecture

Figure 4:
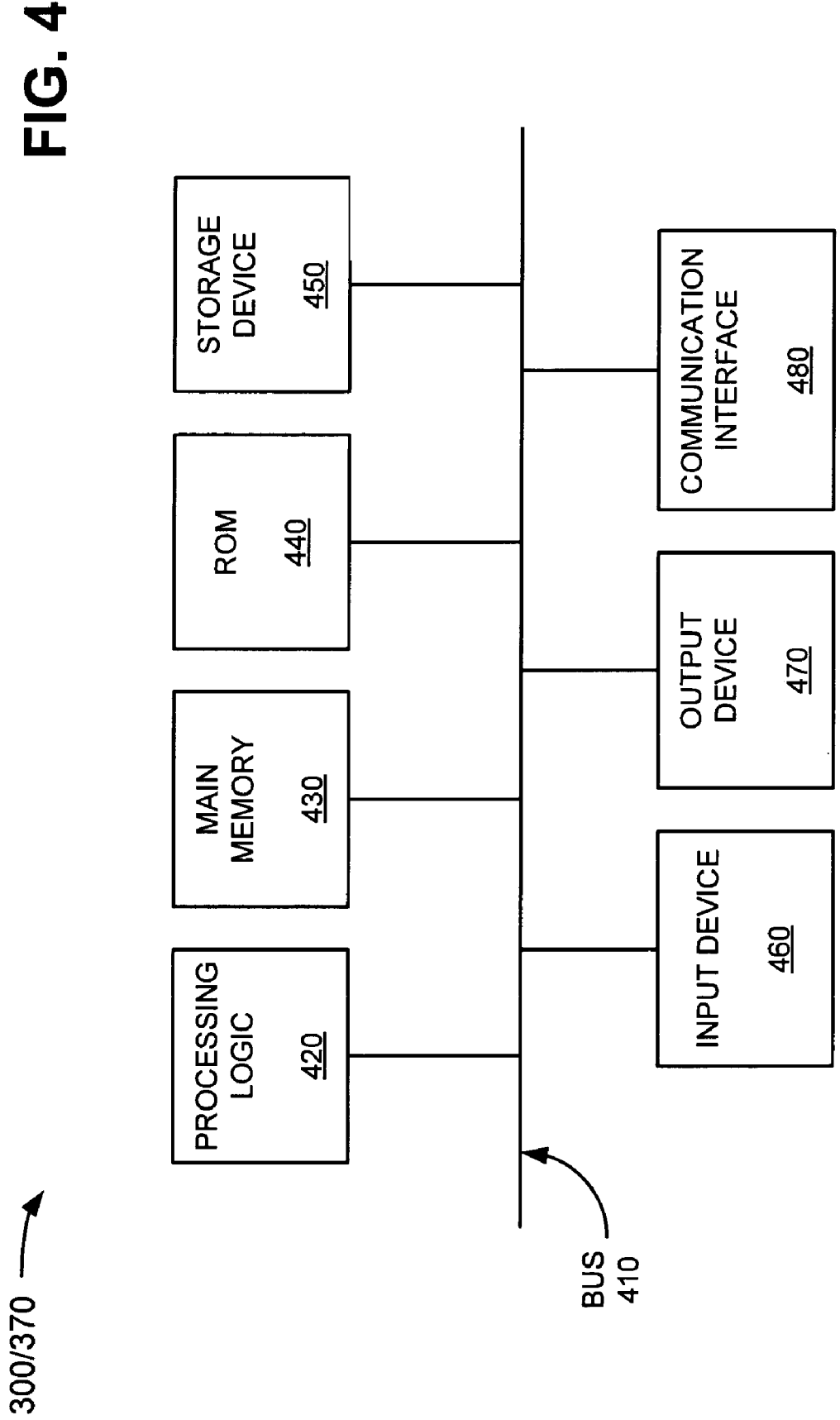
FIG. 4 illustrates exemplary hardware components of a client and/or a web service depicted in FIGS. 3A-3C.

FIG. 4 is an exemplary diagram of an entity corresponding to client 300 and/or web service 370. As illustrated, the entity may include a bus 410, processing logic 420, a main memory 430, a read-only memory (ROM) 440, a storage device 450, an input device 460, an output device 470, and/or a communication interface 480. Bus 410 may include a path that permits communication among the components of the entity.

Processing logic 420 may include a processor, microprocessor, or other types of processing logic that may interpret and execute instructions. In one implementation, processing logic 420 may include a single core processor or a multi-core processor. In another implementation, processing logic 420 may include a single processing device or a group of processing devices, such as a processor cluster or a computing grid. In still another implementation, processing logic 420 may include multiple processors that may be local or remote with respect each other, and may use one or more threads while processing. In a further implementation, processing logic 420 may include multiple processors implemented as hardware UEs capable of running copies of a technical computing environment.

Main memory 430 may include a random access memory (RAM) or another type of dynamic storage device that may store information and instructions for execution by processing logic 420. ROM 440 may include a ROM device or another type of static storage device that may store static information and/or instructions for use by processing logic 420. Storage device 450 may include a magnetic and/or optical recording medium and its corresponding drive, or another type of static storage device (e.g., a disk drive) that may store static information and/or instructions for use by processing logic 420.

Input device 460 may include a mechanism that permits an operator to input information to the entity, such as a keyboard, a mouse, a pen, a microphone, voice recognition and/or biometric mechanisms, etc. Output device 470 may include a mechanism that outputs information to the operator, including a display, a printer, a speaker, etc. Communication interface 480 may include any transceiver-like mechanism that enables the entity to communicate with other devices and/or systems. For example, communication interface 480 may include mechanisms for communicating with another device or system via a network.

As described in detail herein, the entity depicted in FIG. 4 may perform certain operations in response to processing logic 420 executing software instructions contained in a computer-readable medium, such as main memory 430. A computer-readable medium may be defined as a physical or logical memory device. The software instructions may be read into main memory 430 from another computer-readable medium, such as storage device 450, or from another device via communication interface 480. The software instructions contained in main memory 430 may cause processing logic 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of the entity, in other implementations, the entity may contain fewer, different, or additional components than depicted in FIG. 4. In still other implementations, one or more components of the entity may perform one or more tasks described as being performed by one or more other components of the entity.

Exemplary Parallel Programming Construct

Figure 5:
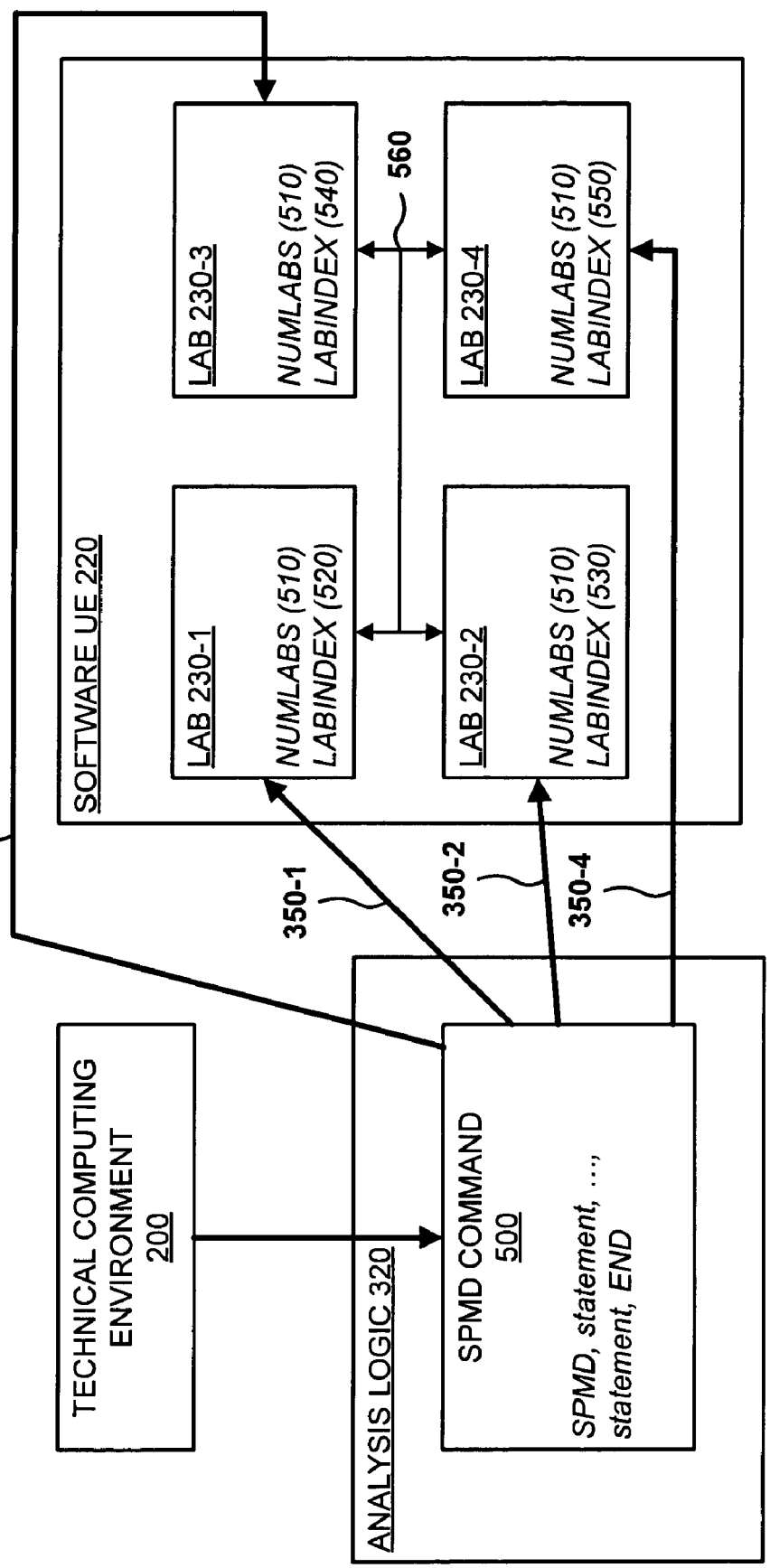
FIG. 5 illustrates an exemplary parallel programming construct capable of being analyzed and transformed to parallel program portions by analysis logic depicted in FIGS. 3A and 3B.

FIG. 5 illustrates an exemplary parallel programming construct (e.g., a SPMD command 500) capable of being analyzed and transformed to parallel program portions by analysis logic 320 of parallel programming interface 130. As shown, SPMD command 500 may be created with TCE 200 and provided to analysis logic 320 of client 300. In other implementations, SPMD command 500 may be created by another device and/or may be provided to analysis logic 320 of client 300. In one example, analysis logic 320 may implement SPMD command 500 to generate program portions 350-1, 350-2, 350-3, and/or 350-4.

SPMD command 500 may permit users to enter into a SPMD mode. In one implementation, SPMD command 500 may support data parallelism where a large amount of data may be distributed across multiple software UEs (e.g., software UEs 220 and/or labs 230) via a distributed arrays API. Operations on the distributed arrays may be coordinated through communication between labs 230 that own pieces of the array. The general form of SPMD command 500 may include:

SPMD, statement, . . . , statement, END.

The "statements" in the body of SPMD command 500 may be executed on resources (e.g., software UEs 220 and/or labs 230) that may be defined by a default configuration. SPMD command 500 may configure these resources as a communicating ring of labs (e.g., ring of labs 230), which may mean that labs 230 may have a same number of labs (e.g., NUMLABS) 510 defined, each lab 230 may have a unique value (e.g., LABINDEX 520, 530, 540, and 550 for labs 230-1, 230-2, 230-3, 230-4, respectively) between one and NUMLABS 510, labs 230 may send data to and from one another, and/or each lab 230 may include a unique random number generator that creates random number streams independent of one another.

Upon completion of SPMD command 500, labs 230 may be "cleaned up," which may mean that labs 230 may be restored to ordinary resources (e.g., after the results are received), NUMLABS 510 and LABINDEX 520-550 may set back to one (or another value), the random number generators may be set back to a default start value, and/or workspaces may be cleared. There may be no implicit data transfer to and from the workspace where SPMD command 500 is called and the workspaces of labs 230 executing the body of SPMD command 500. An error on any of labs 230 executing the body of SPMD command 500 may cause an error in SPMD command 500. A warning on any of labs 230 executing the body of SPMD command 500 may be displayed on a device (e.g., client 300).

SPMD command 500 of the form SPMD NUMWORKERS, statement, . . . , statement, END may execute SPMD command 500 on an anonymous group of a number (e.g., NUMWORKERS) of resources provided within a default resource pool. SPMD command 500 of the form SPMD MYWORKERS, statement, . . . , statement, END may execute SPMD command 500 on a specified group of resources (e.g., MYWORKERS).

The syntax [OUT1,OUT2, . . . ]=SPMD(IN1,IN2, . . . ), statement, . . . , statement, END may transfer variables (e.g., IN1, IN2, . . . ) from client 300 to workspaces of labs 230 at the beginning of SPMD command 500, and may transfer variables (e.g., OUT1, OUT2, . . . ) from one of the workspaces back to client 300 at the end of SPMD command 500. If the variable being transferred from client 300 to labs 230 is a distributed array (e.g., a "darray"), then the variable may be automatically re-distributed to all labs 230. If the variable being transferred from client 300 is a non-distributed array, then the variable may be replicated on all labs 230. If the variable being transferred from labs 230 to client 300 is a replicated array, then a replicated value may be received from any of labs 230. If the variable being transferred from labs 230 to client 300 is a variant array, then a value may be received from one of labs 230. If the variable being transferred from labs 230 to client 300 is a distributed array, then the variable may be automatically re-distributed to be a distributed array over a single lab 230.

In one implementation, SPMD command 500 (and its associated syntax) may be implemented via client 300 (e.g. via analysis logic 320 of client 300), software UEs 220 (including labs 230), and/or TCE 200. In other implementations, SPMD command 500 (and its associated syntax) may be implemented via other software and hardware logic. SPMD command 500 may increase processing performance by dividing large data sets into pieces, and by providing each piece to different resources. Each resource may execute the same program on its piece of data, and the results may be collected.

Although FIG. 5 shows an exemplary parallel programming construct, in other implementations, client 300 may contain fewer, different, or additional parallel programming constructs than depicted in FIG. 5. In still other implementations, the exemplary parallel programming construct may be allocated in other ways than depicted in FIG. 5.

Exemplary Parallel Programming Error Construct

Figure 6:
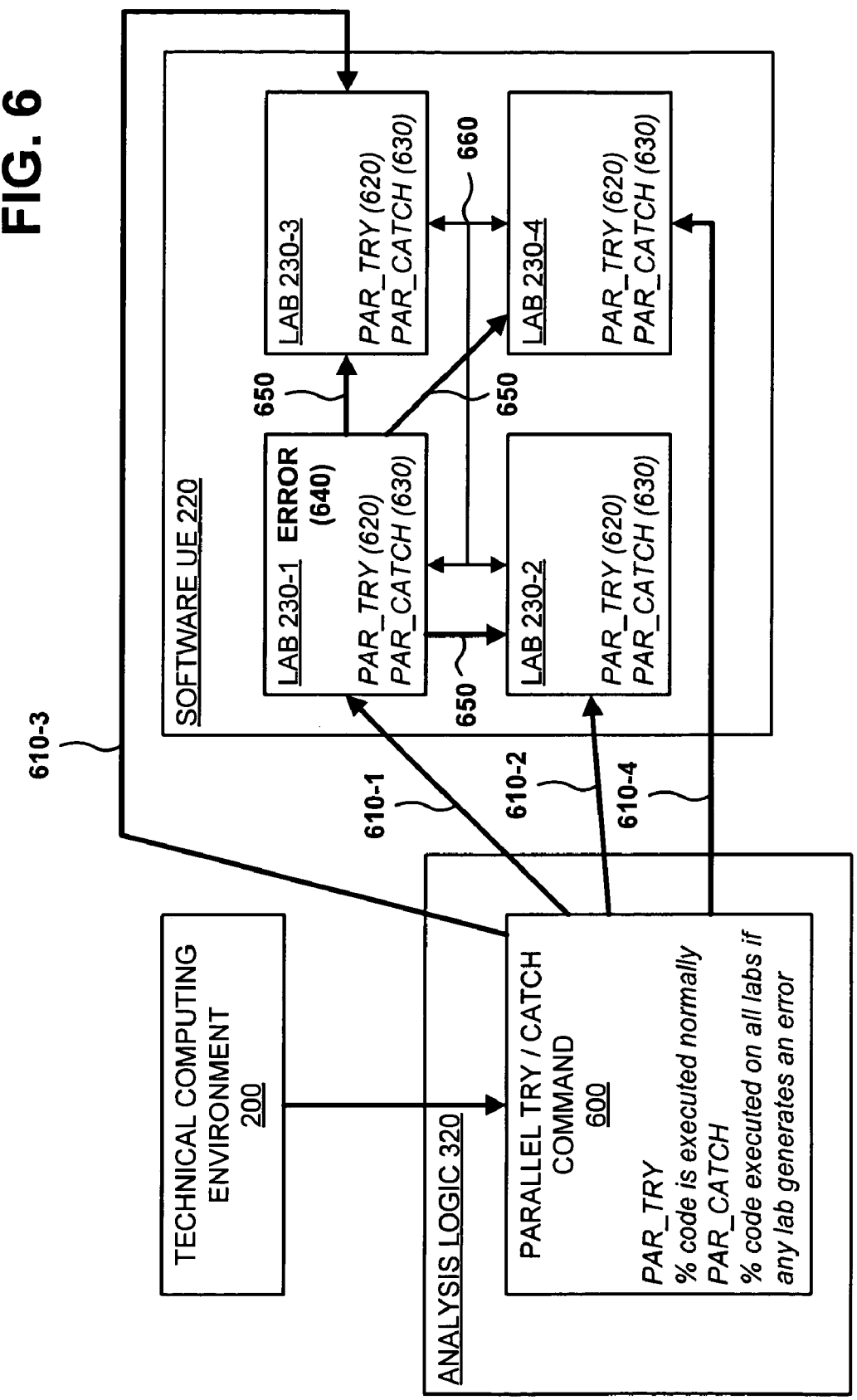
FIG. 6 depicts an exemplary parallel programming error construct capable of being executed by a software unit of execution (UE) of the parallel programming environment depicted in FIG. 2.

FIG. 6 illustrates an exemplary parallel programming error construct (e.g., a parallel try/catch command 600) capable of being executed by a software unit of execution (UE) (e.g., software UE 220 and/or corresponding labs 230). As shown, parallel try/catch command 600 may be created with TCE 200 and provided to analysis logic 320 of client 300. In other implementations, parallel try/catch command 600 may be created by another device and/or may be provided to analysis logic 320 of client 300. In one example, analysis logic 320 may provide copies of parallel try/catch command 600 to labs 230, as indicated by reference numbers 610-1, 610-2, 610-3, and 610-4. A non-error code portion (e.g., a parallel try portion) 620, and/or an error code portion (e.g., a parallel catch portion) 630 of parallel try/catch command 600 may be provided to labs 230-1, 230-2, 230-3, and 230-4. In one implementation, parallel try/catch command 600 may be provided within a SPMD construct (e.g., SPMD command 500) and/or may be executed in a SPMD mode. In other implementations, parallel try/catch command 600 may be provided within threads, processes, etc. other than a SPMD construct.

Parallel try/catch command 600 may permit a program (e.g., a parallel TCE program) to execute completely even if one or more errors occur, to track the one or more errors, and/or to address the one or more errors. In one implementation, parallel try/catch command 600 may support data parallelism where a large amount of data may be distributed across multiple software UEs (e.g., software UEs 220 and/or labs 230) via a distributed arrays API. Operations on the distributed arrays may be coordinated through communication between labs 230 that own pieces of the array. The general form of parallel try/catch command 600 may include:

PAR_TRY

% code executed normally (e.g., non-error code)

PAR_CATCH

% code executed if a lab generates an error (e.g., error code)

Non-error code portion 620 and/or error code portion 630 of parallel try/catch command 600 may be executed on resources (e.g., software UEs 220 and/or labs 230) that may be defined by a default configuration. Non-error code portion 620 of parallel try/catch command 600 may include any parallel TCE program code (e.g., code associated with SPMD command 500), other parallel threads or processes, etc. Error code portion 630 of parallel try/catch command 600 may include any parallel TCE program code, other parallel threads or processes, etc. that may be executed upon detection of an error (e.g., within one or more of labs 230). Although the exemplary general form of parallel try/catch command 600 may include "PAR_TRY" and/or "PAR_CATCH," in other implementations parallel try/catch command 600 may include additional and/or different syntax (e.g., "PAR_NON_ERROR" and/or "PAR_ERROR") than the exemplary general form.

Each of labs 230 may execute non-error code portion 620 of parallel try/catch command 600, and/or may provide results (e.g., information) from execution of non-error code portion 620 to client 300 (not shown in FIG. 6). In one implementation, labs 230 may forward parallel try/catch command 600 to hardware UEs (not shown in FIG. 6) for execution, and/or may receive, from the hardware UEs, results (e.g., information) from the execution of non-error code portion 620 of parallel try/catch command 600.

If one of labs 230 generates an error 640 (e.g., as shown in lab 230-1) during execution of non-error code portion 620, the lab that generates error 640 (e.g., lab 230-1) may send a signal 650 to each of the other labs (e.g., labs 230-2, 230-3, and 230-4). Signals 650 may instruct the other labs that error 640 occurred and that they should begin execution of error code portion 630 of parallel try/catch command 600. In one example, labs 230 may receive, from the hardware UEs, results (e.g., information) from the execution of error code portion 630 of parallel try/catch command 600. Labs 230 may provide the results (e.g., information) from the execution of non-error code portion 620 and/or error code portion 630 of parallel try/catch command 600 to client 300 (not shown in FIG. 6).

In one implementation, each of labs 230 may periodically check to determine if an error has occurred in other labs. In one example, if error 640 occurs and signals 650 are generated, labs 230 may jump to and/or execute error code portion 630 at approximately the same time. In another example, if error 640 occurs and signals 650 are generated, labs 230 may jump to and/or execute error code portion 630 at different times. Client 300 (not shown) may display (e.g., via output device 460) the results (e.g., information) from the execution of non-error code portion 620 and/or error code portion 630 of parallel try/catch command 600.

In contrast to conventional systems that provide error detection via a client, parallel try/catch command 600 may provide error detection via one or more software UEs 220 and/or labs 230, without involvement of client 300. Furthermore, conventional systems cease executing a parallel program upon detection of an error, whereas parallel try/catch command 600 enables a parallel program to continue execution upon detection of an error. Thus, parallel try/catch command 600 provides error-tolerant parallel code.

In exemplary implementations, error code portion 630 may include code that handles any expected error that may occur in non-error code portion 620, code that searches for exception types matching errors generated during execution of non-error code portion 620, code that catches and/or handles out of memory exception errors generated during execution of non-error code portion 620, code that handles input/output (I/O) errors generated during execution of non-error code portion 620, code that may be implemented as a delayed flag operation, code that breaks out a computation (e.g., non-error code portion 620) at various points in its path, etc. In other implementations, error code portion 630 may be layered so that frequently occurring errors may be handled first, followed by less frequently occurring errors, etc.

In one exemplary implementation, a global operation (e.g., "gop.m") may be used as non-error code portion 620, and/or may reduce data on each of labs 230. If "gop.m" generates an error (e.g., error 640) on one of labs 230 (e.g., lab 230-1), lab 230-1 may notify other labs (e.g., labs 230-2, 230-3, and 230-4) of the error (e.g., via signals 650). In pseudo code, "gop.m" might do the following:

```
treeHeight = 1;
par_try
    while treeHeight < numlabs
        if mod(labindex − 1, 2*treeHeight) == treeHeight
            labSend(x, labindex + treeHeight, mwTag1);
        elseif mod(labindex − 1, 2*treeHeight) == 0
                && labindex − treeHeight >= 1
            y = labReceive(labindex − treeHeight, mwTag1);
            % This line below could error in some cases
            % because of the inputs
            x = F(y, x);
        end
        treeHeight = 2*treeHeight;
    end
par_catch
    return some error from here
end
```

The global operation "gop.m" may be generalized as follows.

```
setup_input_data
par_try
    while some_loop_condition
        do_some_message_passing
        calculate_something_on_the_passed_data
        recalculate_loop_condition
    end
par_catch
    deal_with_error
end
```

Assume the syntax "calculate_something_on_the_passed_data" may generate an error. For example, the syntax "calculate_something_on_the_passed_data" may use a "chol" function and input data may produce a non-positive definite matrix that may be passed to the "chol" function on one particular lab. The parallel programming error constructs described herein (e.g., parallel try/catch command 600) may enable "gop.m" to safely avoid this situation so that "gop.m" may decide what to do.

Current serial exception handling systems do not handle exceptions in parallel programs well because if one lab experiences an error, the other labs are unaware of the error and do not execute the error code portion. For example, if a serial exception handling mechanism is provided up a stack of a parallel program, and a parallel algorithm at a lower level of the stack generates an error, there is no way to protect this parallel program without providing error detection in the parallel algorithm. If current systems do not provide such error detection, they risk receiving sporadic, unusual results from the higher level algorithms and have a difficult time tracking down where an error occurred. The parallel programming error constructs described herein (e.g., parallel try/catch command 600) may provide an exception handling system that prevents such situations from occurring and precludes a parallel program from prematurely ending (e.g., due to occurrence of an error).

In one implementation, parallel try/catch command 600 (and its associated syntax) may be implemented via client 300 (e.g. via analysis logic 320 of client 300), software UEs 220 (including labs 230), and/or TCE 200. In other implementations, parallel try/catch command 600 (and its associated syntax) may be implemented via other software and/or hardware logic.

Although FIG. 6 shows an exemplary parallel programming error construct, in other implementations, client 300 may contain fewer, different, or additional parallel programming error constructs than depicted in FIG. 6. In still other implementations, the exemplary parallel programming error construct may be allocated in other ways than depicted in FIG. 6.

Exemplary Processes

Figure 7:
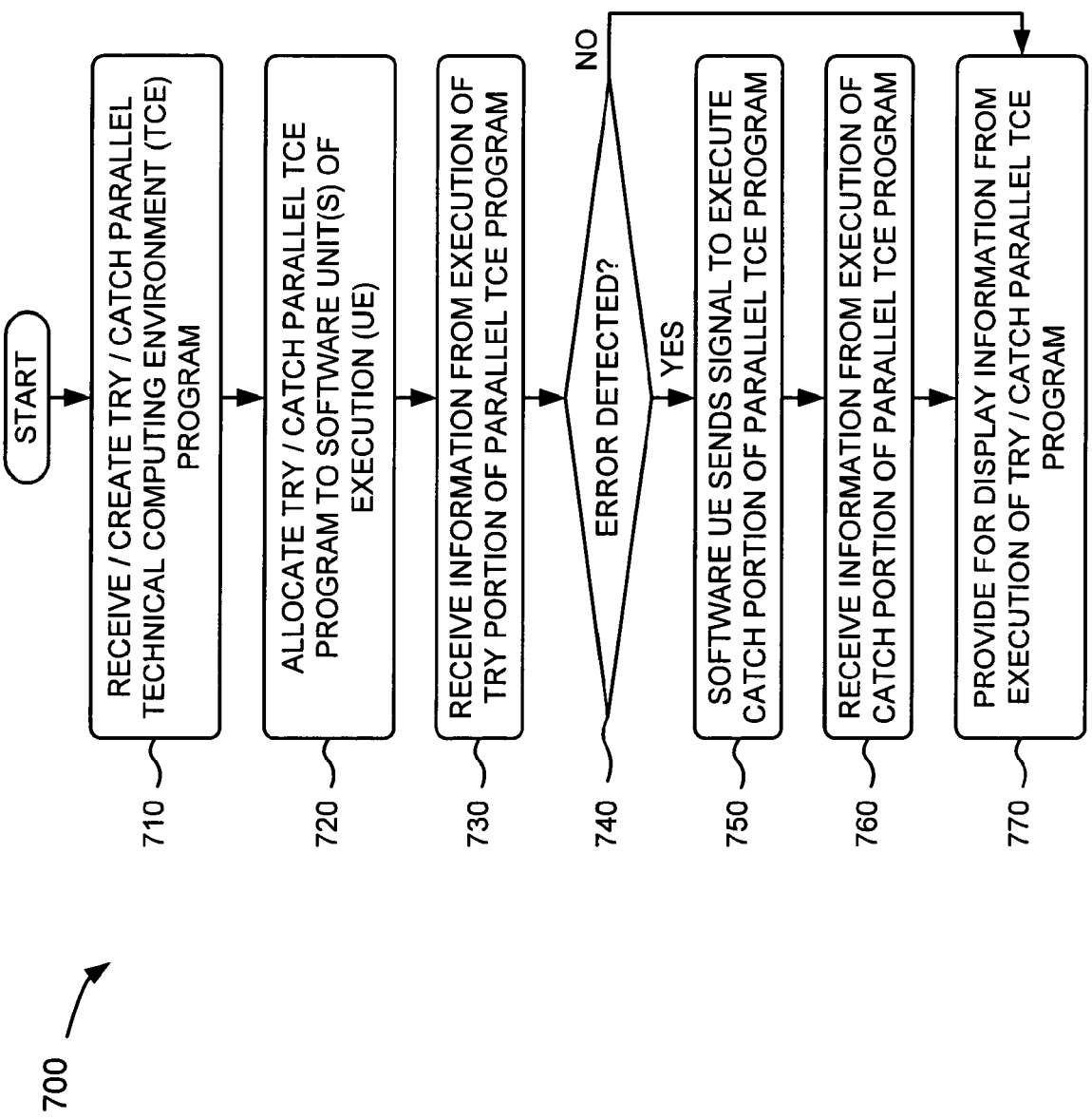
FIGS. 7-9 depict flow charts of exemplary processes according to implementations described herein.

FIG. 7 depicts a flow chart of an exemplary process 700 according to implementations described herein. In one implementation, process 700 may be performed by client 300. In other implementations, process 700 may be performed by other mechanisms (e.g., client 300 in conjunction with web service 370, client 300 in conjunction with software UE 220, etc.).

As shown in FIG. 7, process 700 may begin with receipt and/or creation of a parallel error technical computing environment (TCE) program (e.g., a try/catch parallel TCE program) (block 710). For example, in one implementation described above in connection with FIG. 6, parallel try/catch command 600 may be created with TCE 200 and provided to analysis logic 320 of client 300. In one example, parallel try/catch command 600 may be created by another device and/or may be provided to analysis logic 320 of client 300.

Returning to FIG. 7, the try/catch parallel TCE program may be allocated to one or more software units of execution (UEs) (block 720), and/or information from execution of a non-error (or try) portion of the parallel TCE program may be received (block 730). For example, in one implementation described above in connection with FIG. 6, analysis logic 320 of client 300 may provide copies of parallel try/catch command 600 to labs 230, as indicated by reference numbers 610-1, 610-2, 610-3, and 610-4. Non-error code portion (e.g., a parallel try portion) 620, and/or error code portion (e.g., a parallel catch portion) 630 of parallel try/catch command 600 may be provided to labs 230-1, 230-2, 230-3, and 230-4. In one example, parallel try/catch command 600 may be provided within a SPMD construct (e.g., SPMD command 500) and/or may be executed in a SPMD mode. In other examples, parallel try/catch command 600 may be provided within threads, processes, etc. other than a SPMD construct. Each of labs 230 may execute non-error code portion 620 of parallel try/catch command 600, and/or may provide results (e.g., information) from execution of non-error code portion 620 to client 300 (not shown in FIG. 6).

As further shown in FIG. 7, it may be determined if an error is detected during execution of the try portion of the parallel TCE program (block 740). If an error is detected during execution of the try portion of the parallel TCE program (block 740—YES), one of the one or more software UEs may send a signal to other software UEs to execute an error (or catch) portion of parallel TCE program (block 750), and/or information from execution of the error (or catch) portion of the parallel TCE program may be received (block 760). For example, in one implementation described above in connection with FIG. 6, if one of labs 230 generates error 640 (e.g., as shown in lab 230-1) during execution of non-error code portion 620, the lab that generates error 640 (e.g., lab 230-1) may send signal 650 to each of the other labs (e.g., labs 230-2, 230-3, and 230-4). Signals 650 may instruct the other labs that error 640 occurred and that they should begin execution of error code portion 630 of parallel try/catch command 600. Labs 230 may provide the results (e.g., information) from the execution of error code portion 630 of parallel try/catch command 600 to client 300 (not shown in FIG. 6).

Returning to FIG. 7, if an error is not detected during execution of the try portion of the parallel TCE program (block 740—NO) or if block 760 is complete, information from execution of the try and/or catch portions of the parallel TCE program may be provided for display (block 770). For example, in one implementation described above in connection with FIG. 6, client 300 (not shown) may display (e.g., via output device 460) the results (e.g., information) from the execution of non-error code portion 620 and/or error code portion 630 of parallel try/catch command 600. In one example, the displayed results may provide an indication to a user (e.g., of client 300) of where an error occurred in non-error code portion 620, and the user may take remedial measures to correct the error (e.g., rewrite one or more sections of non-error code portion 620 to address the error). Parallel try/catch command 600 also enables a parallel program to continue execution upon detection of an error, unlike conventional systems.

Figure 8:
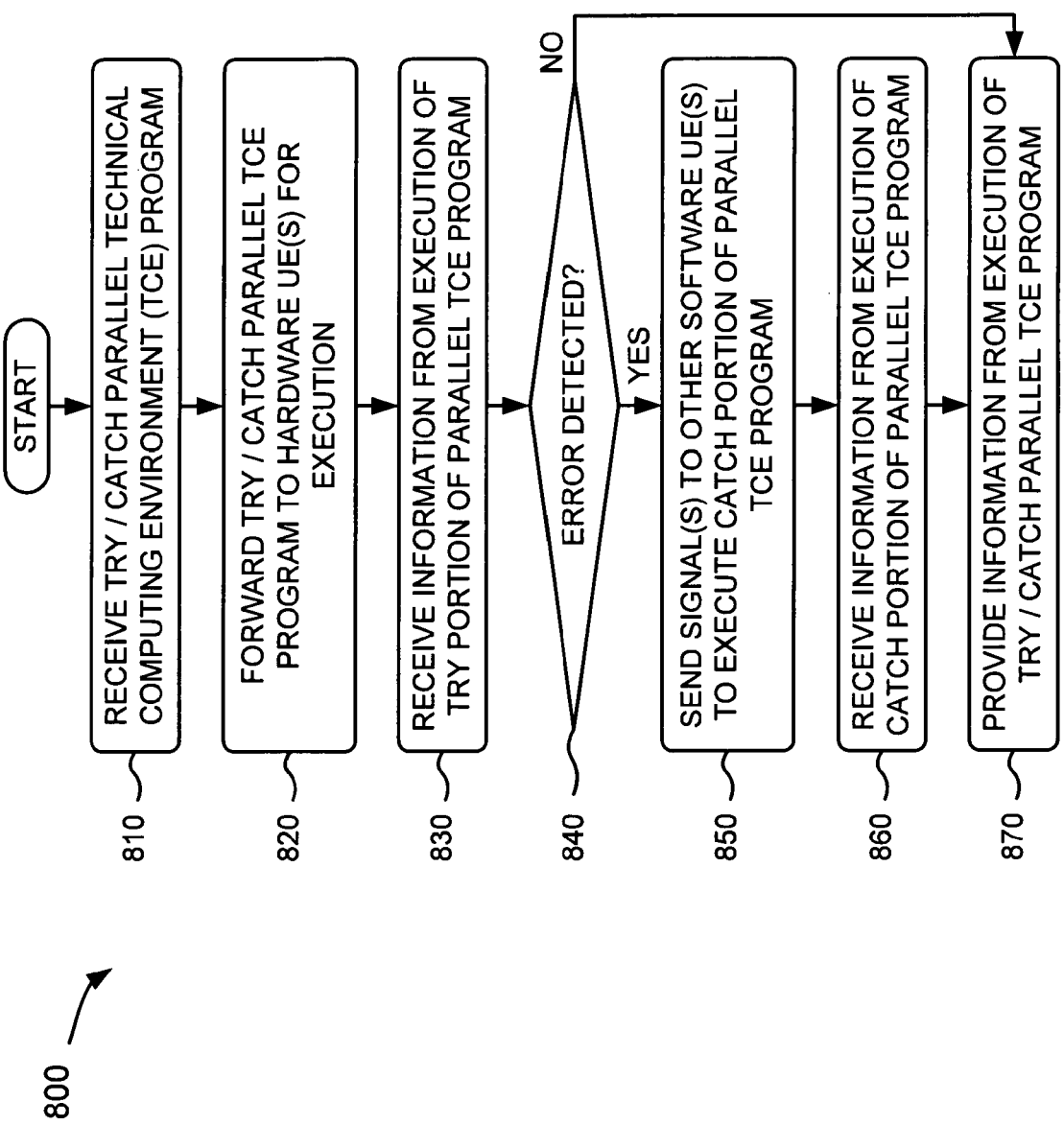

FIG. 8 depicts a flow chart of an exemplary process 800 according to implementations described herein. In one implementation, process 800 may be performed by one or more software UEs 220. In other implementations, process 800 may be performed by other mechanisms (e.g., client, 300, client 300 in conjunction with web service 370, client 300 in conjunction with software UEs 220, etc.).

As shown in FIG. 8, process 800 may begin with receipt of a parallel error technical computing environment (TCE) program (e.g., a try/catch parallel TCE program) (block 810). For example, in one implementation described above in connection with FIG. 6, parallel try/catch command 600 may be created with TCE 200 and provided to analysis logic 320 of client 300. Analysis logic 320 of client 300 may provide copies of parallel try/catch command 600 to labs 230, as indicated by reference numbers 610-1, 610-2, 610-3, and 610-4. Non-error code portion (e.g., parallel try portion) 620, and/or error code portion (e.g., parallel catch portion) 630 of parallel try/catch command 600 may be provided to labs 230-1, 230-2, 230-3, and 230-4. In one example, parallel try/catch command 600 may be provided within a SPMD construct (e.g., SPMD command 500) and/or may be executed in a SPMD mode. In other examples, parallel try/catch command 600 may be provided within threads, processes, etc. other than a SPMD construct.

Returning to FIG. 8, the try/catch parallel TCE program may be forwarded to one or more hardware UEs for execution (block 820), and/or information from execution of a non-error (or try) portion of the parallel TCE program may be received (block 830). For example, in one implementation described above in connection with FIG. 6, each of labs 230 may execute non-error code portion 620 of parallel try/catch command 600, and/or may provide results (e.g., information) from execution of non-error code portion 620 to client 300 (not shown in FIG. 6). In one example, labs 230 may forward parallel try/catch command 600 to hardware UEs (not shown in FIG. 6) for execution, and/or may receive, from the hardware ULs, results (e.g., information) from the execution of non-error code portion 620 of parallel try/catch command 600.

As further shown in FIG. 8, it may be determined if an error is detected during execution of the try portion of the parallel TCE program (block 840). If an error is detected during execution of the try portion of the parallel TCE program (block 840—YES), the software UE where the error is detected may send a signal to other software UEs to execute an error (or catch) portion of parallel TCE program (block 850), and/or information from execution of the error (or catch) portion of the parallel TCE program may be received (block 860). For example, in one implementation described above in connection with FIG. 6, if one of labs 230 generates error 640 (e.g., as shown in lab 230-1) during execution of non-error code portion 620, the lab that generates error 640 (e.g., lab 230-1) may send signal 650 to each of the other labs (e.g., labs 230-2, 230-3, and 230-4). Signals 650 may instruct the other labs that error 640 occurred and that they should begin execution of error code portion 630 of parallel try/catch command 600. Labs 230 may receive, from the hardware UEs, results (e.g., information) from the execution of error code portion 630 of parallel try/catch command 600.

Returning to FIG. 8, if an error is not detected during execution of the try portion of the parallel TCE program (block 840—NO) or if block 860 is complete, information from execution of the try and/or catch portions of the parallel TCE program may be provided (block 870). For example, in one implementation described above in connection with FIG. 6, labs 230 may provide the results (e.g., information) from the execution of non-error code portion 620 and/or error code portion 630 of parallel try/catch command 600 to client 300 (not shown in FIG. 6).

Figure 9:
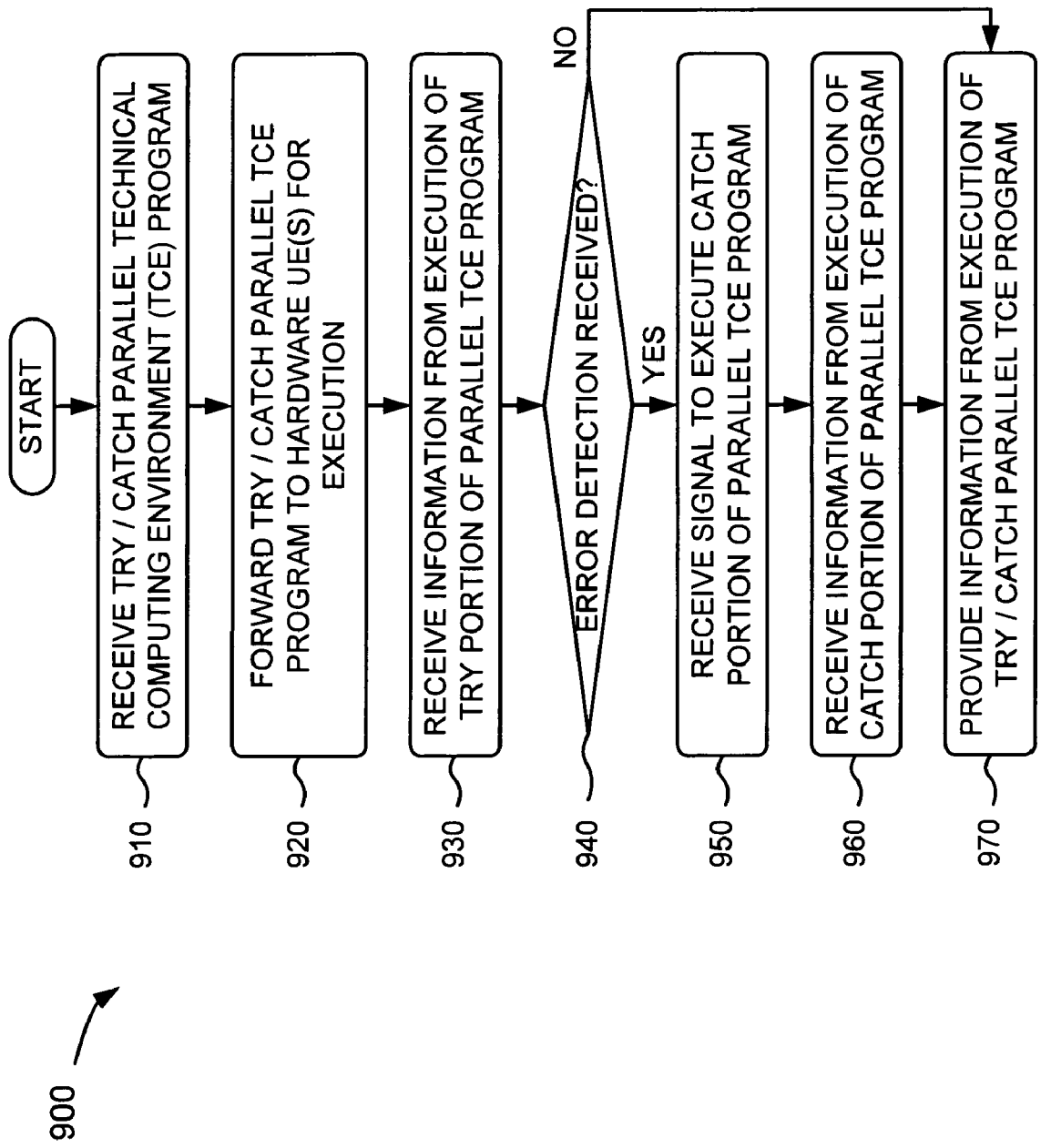

FIG. 9 depicts a flow chart of an exemplary process 900 according to implementations described herein. In one implementation, process 900 may be performed by one or more software UEs 220. In other implementations, process 900 may be performed by other mechanisms (e.g., client, 300, client 300 in conjunction with web service 370, client 300 in conjunction with software UEs 220, etc.).

As shown in FIG. 9, process 900 may begin with receipt of a parallel error technical computing environment (TCE) program (e.g., a try/catch parallel TCE program) (block 910). For example, in one implementation described above in connection with FIG. 6, parallel try/catch command 600 may be created with TCE 200 and provided to analysis logic 320 of client 300. Analysis logic 320 of client 300 may provide copies of parallel try/catch command 600 to labs 230, as indicated by reference numbers 610-1, 610-2, 610-3, and 610-4. Non-error code portion (e.g., parallel try portion) 620, and/or error code portion (e.g., parallel catch portion) 630 of parallel try/catch command 600 may be provided to labs 230-1, 230-2, 230-3, and 230-4. In one example, parallel try/catch command 600 may be provided within a SPMD construct (e.g., SPMD command 500) and/or may be executed in a SPMD mode. In other examples, parallel try/catch command 600 may be provided within threads, processes, etc. other than a SPMD construct.

Returning to FIG. 9, the try/catch parallel TCE program may be forwarded to one or more hardware UEs for execution (block 920), and/or information from execution of a non-error (or try) portion of the parallel TCE program may be received (block 930). For example, in one implementation described above in connection with FIG. 6, each of labs 230 may execute one or more segments (or portions) of non-error code portion 620 of parallel try/catch command 600, and/or may provide results (e.g., information) from execution of the one or more segments of non-error code portion 620 to client 300 (not shown in FIG. 6). Labs 230 may forward parallel try/catch command 600 to hardware UEs (not shown in FIG. 6) for execution, and/or may receive, from the hardware UEs, results (e.g., information) from the execution of the one or more segments of non-error code portion 620 of parallel try/catch command 600.

As further shown in FIG. 9, it may be determined if an error is detected during execution of the try portion of the parallel TCE program (block 940). If an error is detected during execution of the try portion of the parallel TCE program is received (block 940—YES), a signal to execute an error (or catch) portion of parallel TCE program may be received (block 950), and/or information from execution of the error (or catch) portion of the parallel TCE program may be received (block 960). For example, in one implementation described above in connection with FIG. 6, if one of labs 230 generates error 640 (e.g., as shown in lab 230-1) during execution of non-error code portion 620, the lab that generates error 640 (e.g., lab 230-1) may send signal 650 to each of the other labs (e.g., labs 230-2, 230-3, and 230-4). Signals 650 may be received by the other labs and may instruct the other labs to begin execution of error code portion 630 of parallel try/catch command 600. Labs 230 may receive, from the hardware UEs, results (e.g., information) from the execution of error code portion 630 of parallel try/catch command 600.

Returning to FIG. 9, if an error detected during execution of the try portion of the parallel TCE program is not received (block 940—NO) or if block 960 is complete, information from execution of the try and/or catch portions of the parallel TCE program may be provided (block 970). For example, in one implementation described above in connection with FIG. 6, Labs 230 may provide the results (e.g., information) from the execution of non-error code portion 620 and/or error code portion 630 of parallel try/catch command 600 to client 300 (not shown in FIG. 6).

CONCLUSION

Implementations described herein may include a parallel programming error construct or mechanism that enables a parallel TCE program to execute normally if no errors are detected, and that enables the parallel TCE program to execute an error catching portion of the parallel TCE program if an error is detected. For example, in one implementation, one or more portions of the parallel programming error construct may be allocated to one or more software UEs, and/or the one or more software UEs may receive information generated during execution of a non-error portion of the parallel TCE program. If an error is detected by one or more of the software UEs during execution of the parallel TCE program, the one or more software UEs may send a signal to execute an error portion of the parallel TCE program to other software UEs. The one or more software UEs may receive information from execution of the error portion of the parallel TCE program. Information from execution of the non-error portion and the error portion of the parallel TCE program may be provided for display.

The foregoing description of implementations provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 7-9, the order of the acts may be modified in other implementations. Further, non-dependent acts may be performed in parallel.

Also, the term "user" has been used herein. The term "user" is intended to be broadly interpreted to include a client and/or web service or a user of a client and/or web service.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A computing device-implemented method, comprising:
   allocating a program to a first software unit of execution and a second software unit of execution;
   executing, by the first software unit of execution and the second software unit of execution in parallel, a first portion of the program;
   monitoring, by the first software unit of execution and during executing of the first portion of the program by the second software unit of execution, the second software unit of execution;
   determining, by the first software unit of execution, that an error has occurred in the second unit of execution during execution of the first portion of the program;
   sending, by the first software unit of execution and in response to determining that the error has occurred, a signal to the second software unit of execution to execute a second portion of the program that differs from the first portion of the program;
   executing, by the first software unit of execution and second software unit of execution and after sending the signal, the second portion of the program; and
   providing, for display, information associated with executing the first portion and executing the second portion of the program by the first software unit of execution and the second software unit of execution.

2. The computing device-implemented method of claim 1, where the first portion of the program includes a try portion and the second portion of the program includes a catch portion.

3. The computing device-implemented method of claim 1, where monitoring the second software unit of execution further comprises:
   periodically monitoring, by the first software unit of execution and during executing of the first portion of the program by the second software unit of execution, the second software unit of execution; and
   periodically monitoring, by the second software unit of execution and during executing of the first portion of the program by the first software unit of execution, the first software unit of execution.

4. The computing device-implemented method of claim 1, where executing the second portion of the program comprises at least one of:
   executing the second portion of the program simultaneously, with the first and second software units of execution, after the error is detected; or
   executing the second portion of the program at different times, with the first and second software units of execution, after the error is detected.

5. The computing device-implemented method of claim 1, further comprising:
   implementing the program via a single program, multiple data construct; and
   executing the program in a single program, multiple data mode.

6. The computing device-implemented method of claim 1, further comprising:
   receiving non-error information associated with execution of the first portion of the program by the first and second software units of execution;
   receiving error information associated with execution of the second portion of the program by the first and second software units of execution when the error is detected;
   providing, for display, the non-error information; and
   providing, for display, the error information when the error is detected.

7. The computing device-implemented method of claim 1, where the method further comprises:
   monitoring, by the second software unit of execution, the first software unit of execution during executing of the first portion of the program by the first software unit of execution.

8. A computer-readable memory device that stores computer-executable instructions, comprising:
   one or more instructions for receiving a program with a plurality of software units of execution;
   one or more instructions for executing, by the plurality of software units of execution, a first portion of the program;
   one or more instructions for determining, by one of the plurality of software units of execution, that an error is detected in another of the plurality of software units of execution during execution of the first portion of the program by the other of the plurality of software units of execution; and
   one or more instructions for sending, by the one of the plurality of software units of execution and in response to determining that the error is detected, a signal, to the other of the plurality of software units of execution, to execute a second portion of the program.

9. The computer-readable memory device of claim 8, further comprising:
   one or more instructions for executing the second portion of the program when the error is detected; and
   one or more instructions for generating information associated with execution of the first portion and the second portion of the program by the plurality of software units of execution.

10. The computer-readable memory device of claim 8, where the program comprises a general form of:

---
PAR_TRY
   non-error portion
PAR_CATCH
   error portion.
---

11. The computer-readable memory device of claim 8, where the program comprises at least one of:
   a parallel error program created via a text-based environment;

a parallel error program created via a graphically-based environment; or a parallel error program created via a hybrid environment that includes a text-based environment and a graphically-based environment.

12. The computer-readable memory device of claim 8, where the program comprises a try/catch parallel technical computing environment program that includes a try portion that corresponds to the first portion and a catch portion that corresponds to the second portion.

13. The computer-readable memory device of claim 8, further comprising:
   one or more instructions for forwarding the program to a hardware unit of execution; and
   one or more instructions for receiving, from the hardware unit of execution, information associated with execution of the first portion and the second portion of the program by the hardware unit of execution.

14. The computer-readable memory device of claim 13, further comprising:
   one or more instructions for forwarding the information to a client device.

15. The computer-readable memory device of claim 8, further comprising:
   one or more instructions for periodically monitoring, by the one of the plurality of the software units of execution the other of the plurality of software units of execution.

16. The computer-readable memory device of claim 8, further comprising at least one of:
   one or more instructions for executing the second portion of the program simultaneously with two or more of the plurality of software units of execution; or
   one or more instructions for executing the second portion of the program at different times with two or more of the plurality of software units of execution.

17. The computer-readable memory device of claim 8, further comprising:
   one or more instructions for implementing the program via a single program, multiple data construct; and
   one or more instructions for executing the program in a single program, multiple data mode.

18. A computer-readable memory device that stores computer-executable instructions, comprising:
   one or more instructions for receiving a program with a first software unit of execution;
   one or more instructions for executing, by the first software unit of execution, a first portion of the program;
   one or more instructions for determining, by the first software unit of execution, that an error has occurred in a second software unit of execution that is also executing the first portion of the program;
   one or more instructions for executing, by the first software unit of execution and in response to determining that the error has occurred in the second software unit of execution, the second portion of the program; and
   one or more instructions for generating information associated with execution, by the first software unit of execution, of the first portion and the second portion of the program.

19. The computer-readable memory device of claim 18, further comprising:
   one or more instructions for forwarding the program to a hardware unit of execution; and
   one or more instructions for receiving, from the hardware unit of execution, the information associated with execution of the first portion and the second portion of the program by the hardware unit of execution.

20. The computer-readable memory device of claim 19, further comprising:
   one or more instructions for forwarding the information to a client device.

21. The computer-readable memory device of claim 18, further comprising:
   one or more instructions for executing, by the second software unit of execution, the second portion of the program; and
   where the computer-readable memory device further comprises at least one of:
      one or more instructions for executing the second portion of the program simultaneously with the first software unit of execution and the second software unit of execution, or
      one or more instructions for executing the second portion of the program, at different times, with the first software unit of execution and the second software unit of execution.

22. The computer-readable memory device of claim 18, further comprising:
   one or more instructions for implementing the program via a single program, multiple data construct; and
   one or more instructions for executing the program in a single program, multiple data mode.

23. The computer-readable memory device of claim 18, where the program comprises a try/catch parallel technical computing environment program that includes a try portion that corresponds to the first portion and a catch portion that corresponds to the second portion.

24. The computer-readable memory device of claim 18, where the one or more instructions for determining further comprise:
   one or more instructions for periodically monitoring, by the first software unit of execution, the second software unit of execution during executing of the first portion of the program by the first software unit of execution.

25. A system, comprising:
   means for receiving a program;
   means for allocating the program to a first software unit of execution and a second software unit of execution;
   means for executing by the first software unit of execution and the second software unit of execution, a first portion of the program;
   means for detecting, by the first software unit of execution, that an error occurs in the second software unit of execution during execution of the first portion of the program by the second software unit of execution;
   means for sending a signal, from the first software unit of execution to the second software unit of execution, to execute a second portion of the program;
   means for executing, by the first software unit of execution and the second software unit of execution and after sending the signal, the second portion of the program; and
   means for providing for display information associated with execution of the first portion and the second portion of the program.

* * * * *